Aug. 20, 1968
N. D. WHITEHILL
3,397,433
MECHANISM FOR OPERATING AND DISCONNECTING
A SHEATHED CABLE
Filed Jan. 27, 1967
2 Sheets-Sheet 1
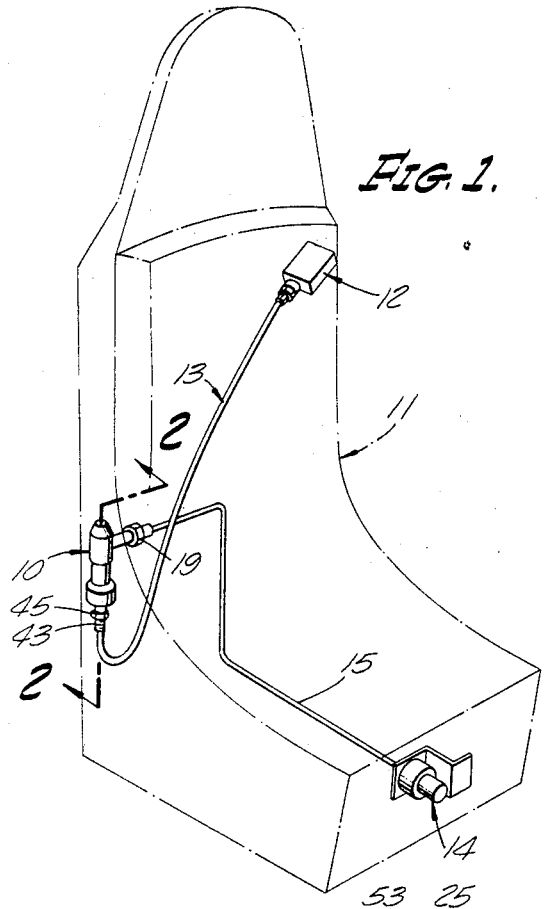
FIG. 1.
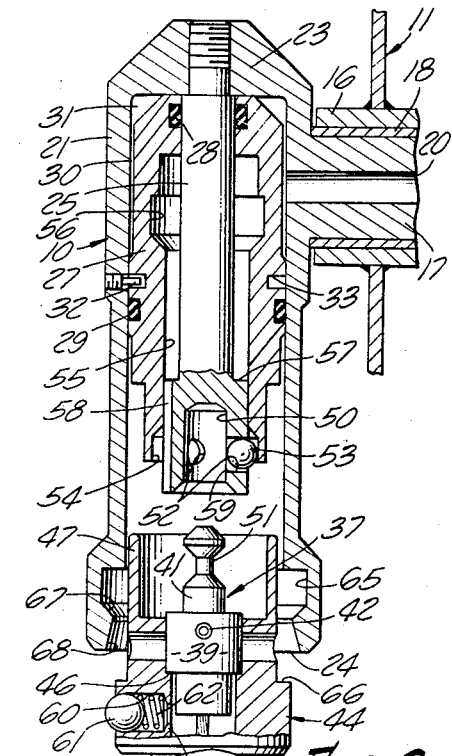
FIG. 6.
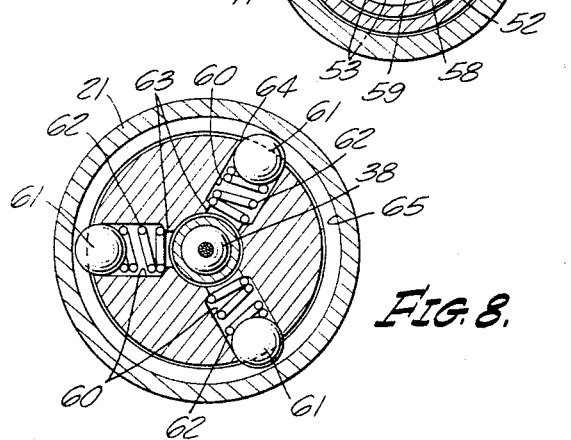
FIG. 7.
FIG. 8.
NORRIS D. WHITEHILL
INVENTOR.
BY Lyon & Lyon
ATTORNEYS

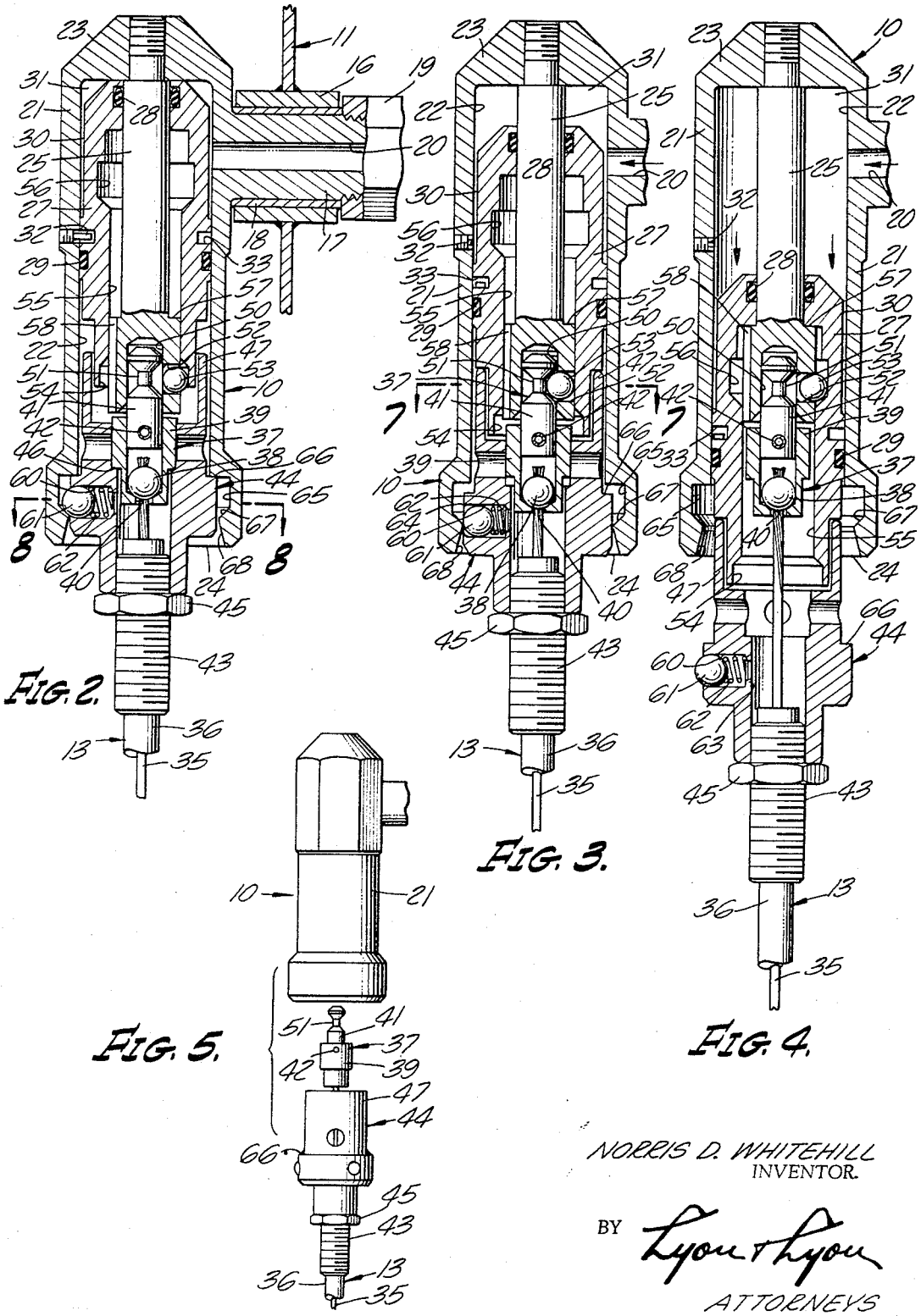

United States Patent Office 3,397,433
Patented Aug. 20, 1968

3,397,433
MECHANISM FOR OPERATING AND DISCONNECTING A SHEATHED CABLE
Norris D. Whitehill, Tujunga, Calif., assignor to Walter Kidde & Company, Belleville, N.J., a corporation of New York
Filed Jan. 27, 1967, Ser. No. 612,198
10 Claims. (Cl. 24—230)

ABSTRACT OF THE DISCLOSURE

An apparatus to operate and then release a sheathed, tension-actuated cable which is readily and releasably connected to the apparatus where actuation moves a piston through a stroke for first causing elements to grip the cable, then urging the enclosing sheath outwardly to cause tension actuation of the cable and finally releasing both the sheath and the cable from the apparatus.

---

This invention relates to a mechanism for sequentially operating a tension actuatable cable, and disconnecting the cable and its enclosing sheath which permits a simple selective release of the cable and sheath as desired. In particular this invention is directed to a mechanism for use with an aircraft seat ejection, and personal parachute deployment system wherein the seat and occupant are separated following ejection, and yet the parachute worn by the occupant is deployed automatically by a tension force on a sheathed cable connected to the seat mounted mechanism of this invention.

The device of this invention serves to perform the same functions as the device of which I am a co-inventor in U.S. Patent No. 3,270,387, Flexible Enclosed Cable Operating and Disconnect Mechanism, but the present device has many advantages both in manufacture and operation. As set forth in the aforementioned patent, there are somewhat conventional aircraft seat ejection, and parachute deployment systems wherein the series of operations are initiated by the occupant of the seat and continue automatically through physical deployment of the parachute by means of a ballistic drogue gun. In the more desirable systems the parachute is worn by the occupant rather than being attached to the seat, and after the occupied seat has cleared the aircraft, the seat and occupant are physically separated. However, since the various actuators for accomplishing the seat ejection, and man seat separation are preferably mounted on the seat, the parachute drogue gun must first be actuated by means connected to the seat, and then such means must be disconnected automatically and rapidly to allow man seat separation. One reliable means that has been found for actuating the parachute drogue gun is a conventional tension cable and enclosing sheath, and the device of the aforementioned patent served the function of first pulling the cable, and then releasing both the cable and sheath to allow the man seat separation. However, the man normally wears the parachute to and from the aircraft, thereby necessitating the connection and disconnection of the actuating cable and sheath to the seat mounted mechanism on each occasion, and this has been found to be relatively awkward with the device of the aforementioned patent.

Thus it is a principal object of this invention to provide an improved form of tension cable operating and disconnect mechanism, wherein the tension cable and enclosing sheath are readily connected to and released from the mechanism.

Another object of this invention is to provide such a mechanism wherein the actuating tension cable is not latched to the mechanism until initiation of the actual operation for tensioning the cable, whereby the cable and enclosing sheath may be readily connected to and released from the mechanism by a releasable connection between the mechanism and the enclosing sheath, without any possibility of immediately actuating the cable.

A further object of this invention is to provide a novel form of tension cable operating, and disconnect mechanism, wherein the relative movement for tension operation is achieved by fixedly holding the tension cable while urging the enclosing sheath out of the mechanism, thereby also serving to disconnect the sheath from the mechanism.

Another object is to provide such a mechanism wherein the tension cable and enclosing sheath are physically and forceably ejected from the mechanism by the actuating movement.

Still another object of this invention is to provide a novel form of tension cable operating and disconnect mechanism, wherein the cable and enclosing sheath are normally held in position, in the mechanism, solely by a resilient detent means on the sheath, whereby the cable and sheath are installed in the mechanism by simply plugging thereinto, and may be released therefrom by a simple predetermined tension force on the sheath.

A further object is to provide such a mechanism with a pivotal mounting, whereby the releasing tension force applied to the sheath will be applied in an in-line relationship to the mechanism.

Other and more detailed objects and advantages of this invention will appear from the following description and accompanying drawings, wherein:

FIGURE 1 is a perspective view of a typical aircraft seat on which the mechanism of this invention may be mounted, and the relationship of the system actuator and the parachute drogue gun, to the mechanism of this invention.

FIGURE 2 is a sectional elevation view of the mechanism of this invention taken substantially on the line 2—2 as shown in FIGURE 1, and with the components in their normal coupled, but unactuated, condition.

FIGURE 3 is a sectional view similar to FIGURE 2, and showing the components of the mechanism in an intermediate position during the actuation for operating the tension cable.

FIGURE 4 is a sectional view similar to FIGURES 2 and 3, and showing the components of the mechanism in a further position at the moment of completion of the actuation of the tension cable, and with the cable and sheath released, but not separated from the mechanism.

FIGURE 5 is an elevation view of the mechanism and shathed cable completely separated as would occur immediately subsequent to the condition shown in FIGURE 4.

FIGURE 6 is a sectional elevation view similar to FIGURE 2, but showing the relative positions of the components during coupling and uncoupling of the sheathed cable without actuation of the cable.

FIGURE 7 is a sectional plan view taken substantially on the line 7—7 in FIGURE 3, and showing the cable gripping latch means of the device.

FIGURE 8 is a sectional plan view taken substantially on the line 8—8 in FIGURE 2, and showing the detent means for resiliently coupling the enclosing sheath to the mechanism.

Referring now to FIGURE 1, the mechanism of this invention, generally designated 10, is mounted on the side of an aircraft ejection seat 11 in a manner hereinafter described in greater detail. While the mechanism 10 will hereafter be described as performing a particular function in conjunction with an aircraft seat ejection system, it is to be understood and will readily appear to those skilled in the art that the mechanism 10 may be employed for accomplishing functions in various systems. The seat ejection system may be of any conventional type wherein the occupant remains in the seat during departure of the seat from the aircraft, and then the seat and man separate for parachute deployment. The parachute is worn on the back of the man, and is automatically and physically deployed by a drogue parachute deployment gun 12, mounted on the parachute pack (not shown). The drogue gun 12 employs a projectile attached to the drogue or pilot parachute, and the gun 12 ballistically discharges the projectile upward and outward to deploy the parachute. A sheathed cable or lanyard 13, comprising a flexible tension cable, enclosed in a flexible housing or sheath, connects the drogue gun 12 to the mechanism 10 of this invention. Basically, the function of the mechanism 10 is to initiate the firing of the drogue gun 12 through the lanyard 13, and then to disconnect the lanyard 13 from the mechanism 10, whereby the man and seat 11 may separate. An appropriate time delay is normally provided in the drogue gun 12 to allow both for disconnect of the lanyard 13, and for substantial physical separation between the man and seat before the parachute is deployed. The various other components for accomplishing the seat ejection and man-seat separation may be conventional, and normally are provided on the seat, including a gas generating actuator 14, which is initiated at the appropriate time during the ejection sequence to supply pressurized gas through tube 15 to the mechanism 10.

Referring now to the remaining figures wherein the mechanism 10 is shown in greater detail, and particularly to FIGURE 2, the mechanism 10 is pivotally mounted on the side of seat 11 by any convenient means for allowing pivoting about a lateral axis. As shown, the pivotal mounting may include a short tube 16, secured to the frame 11, for supporting a journal projection 17 on the side of mechanism 10, and a bearing sleeve or bushing 18 may be interposed between the tube 16 and journal 17. The gas pressure supply, tube 15, is connected through any convenient swivel connection 19 to the end of journal 17, whereby the gas pressure from actuator 14 may be communicated through a passageway 20 in journal 17 to the main housing 21 of the mechanism 10. The pivotal connection between mechanism 10 and seat 11 allows the mechanism 10 to assume any convenient attitude pointing either downwardly, (as shown), forwardly, or upwardly, whereby any tension force on the lanyard 13 will be applied in straight-line relationship to the mechanism 10. The advantage of this self-aligning feature will become more apparent hereinafter in considering the ability to uncouple the lanyard 13 from the mechanism, without actuating the drogue gun 12. Moreover, this ability to point the mechanism 10 in any desired direction makes it more convenient for coupling the lanyard 13 to the mechanism 10 when the man first occupies the seat.

The housing 21 is generally cylindrical and has an internal bore 22 with a closed end 23, and an open end 24. The housing is normally oriented with the open end 24 pointing downwardly, as depicted in the drawings, and therefore will be described in that context, although it will readily be appreciated from the foregoing description of the pivotal mounting that the housing can assume any convenient orientation. A central stem or rod 25 is mounted in the housing 21 by threaded connection 26 at the closed end 23. The rod 25 extends downwardly, a substantial distance toward the open end 24, and is concentric with the bore 22. A tubular shaped piston 27 is mounted in the housing 21 for sliding movement in the bore 22. The piston 27 is provided with a seal ring 28 on its internal surface near the upper-end for sealably engaging the rod 25, and is provided with a second seal ring 29 on its exterior surface sealably engaging the bore 22 below the inlet passageway 20. The tubular piston 27 is provided with a slightly reduced outer diameter at portion 30, adjacent and above the location of passageway 20, whereby the pressurized gas supplied through passageway 20 will readily communicate with the chamber 31 formed between the upper end of tubular piston 27 and bore 22. The initial position of the piston 27 before actuation of the mechanism 10 is as shown in FIGURE 2, with the piston abutting the upper closed end 23 of the housing, and as thus far described, it may be seen that the introduction of pressurized gas through passageway 20 will force the piston 27 downwardly. The piston 27 is normally retained in this uppermost position by a shear pin 32, projecting laterally through the wall of housing 21 into an annular groove 33 provided in the exterior surface of the piston 27, above the location of seal ring 29. Thus, a certain magnitude of pressure and force must be applied to the piston 27 before the pin 32 can be sheared to allow the piston to move downward.

The drogue gun actuating lanyard 13 is of the conventional type comprising a flexible cable 35 which need only be unyielding to tensile forces and an enclosing sheath 36, which is flexible but unyielding, to both tensile and compressive forces. Actuation of the drogue gun 12 is accomplished by a relative movement between the cable and sheath of lanyard 13 with such movement being in the direction of pulling on the cable 35 and pushing on the sheath 36 at the mechanism 10. The cable 35 is joined to a coupling, generally designated 37, by means of a ball 38 swaged on the cable 35, and captured in a sleeve 39, having a small hole 40 in the bottom for the cable 35 to pass through. An upwardly extending pin 41 is mounted in sleeve 39 and secured by a lateral roll pin 42 to complete the coupling 37. The sheath 36 of the lanyard 13 is connected to a threaded ferrule 43 which is threadedly joined to a connector, generally designated 44, and anchored thereto by a lock nut 45. In the unactuated relationship between cable 35 and sheath 36, the position of connector 44 relative to coupling 37 is adjusted by threaded ferrule 43 to the illustrated condition, wherein the downwardly facing shoulder 46 on the sleeve 39 engages an upwardly facing shoulder on the connector 44 to precisely locate the coupling and connector. An annular skirt portion 47 extends upwardly on the connector 44 to surround and protect the coupling 37 (as best shown in FIGURE 6) whereby accidental catching and pulling of the coupling 37 and cable 35 is prevented at times when the lanyard 13 is separated from the mechanism 10, such as during transit of the man to and from the aircraft.

Means are provided for selectively latching the coupling 37 and its attached cable 35 to the mechanism 10, and as shown in the drawings, these means may include a bore 50 in the end of rod 25 for receiving the pin portion 41 of the coupling 37. The pin 41 is provided with a groove 51 having tapered axial extremities serving as cam surfaces. The rod 25 is provided with any convenient number of lateral ports 52, such as the three shown in FIGURE 7 which communicate with the bore 50, and a ball 53 is positioned in each port. The balls 53 are moveable laterally between a position for latching the pin 41 thereto, as shown in FIGURE 7, and an outward position as shown in FIGURE 2, where the pin is free to move into and out of the bore 50. The internal bore of piston 27 is provided with a recessed portion 54 directly opposite the balls 53 in the uppermost (normal) position of the piston 27 whereby the balls 53 may assume their outward-unlatched condition, allowing free insertion and removal of the pin 41. During insertion and removal of the pin 41, the balls may move freely inwardly, but the cam surfaces on the groove 51 and the end of the pin readily urge the balls 53 outwardly, without danger of applying an excessive tension force on the cable 35. A substantial length of the internal surface of piston 27 is comprised of a bore 55 which closely fits the lower portion of the rod 25 to urge the balls 53 inwardly when such bore portion of the piston is directly opposite of the balls, thereby latching the pin 41 of coupling 37 to the rod 25. Near the upper end of piston 27 there is provided an annular internal groove 56 which will become positioned opposite the balls 53 in the lowermost position of movement of piston 27, whereby the balls 53 may again move outwardly to release the coupling 37. The rod 25 is provided with an upwardly facing shoulder 57 for engaging the upper end of piston 27 to limit the extent of downward travel of the piston. Below shoulder 57, and between the locations of balls 53, the exterior surface of rod 25 is provided with lengthwise grooves 58 to allow the free passage of air downwardly from the cavity formed between the rod and the internal surface of piston 27, as the piston travels downwardly. The inner extremity of each port 52 has a lip portion 59 for retaining the balls 53 in the ports when the pin 41 is completely removed as in FIGURE 6.

Means are provided for releasably retaining the connector 44 in the housing 21, and as shown in the drawings, these means may comprise solely a resilient retention of the connector 44, such as by detent means. The detent means may include a plurality of lateral bores 60 in the body of the connector, such as the three bores shown with a ball 61, biased outwardly by a coil spring 62 positioned in each bore 60. The inner end of each bore 60 is provided with a shoulder 63 for supporting the spring 62, and the outer extremity of each bore may be provided with an inwardly turned lip portion 64 for retaining the ball in the bore, as best shown in FIGURE 8. An internal groove 65 is provided at the lower open end of housing 21 for receiving the balls 61 of the detent means. An upwardly facing shoulder 66 on the body of connector 44 engages the housing 21 to limit the upward movement of connector 44, and since the balls 61 engage an inclined cam surface 67 at the lower end of the groove 65, the connector 44 is firmly held in the position illustrated in FIGURE 2. A tapered entering surface 68 on the open end of the housing permits the easy insertion of connector 44 by progressively causing depression of the balls 61. The resilient resistance accorded by the detent means against extraction of connector 44 is of predetermined amount which will firmly retain the connector 44 under all normal circumstances, and yet will allow ready release of the connector upon pulling the lanyard 13, this is desirable to permit release of the lanyard 13, without actuating the mechanism 10, such as would occur upon the occupant standing up and leaving the aircraft without intentionally disconnecting the lanyard. This is one of the primary functions of the aforedescribed pivotal mounting of mechanism 10, whereby the pulling force on the lanyard 13 will result in a direct line tension on the connector 44 to release same. Normally, the lanyard 13 will be connected and disconnected from the mechanism 10 by gripping the connector 44 and ferrule 43 as shown in FIGURE 6 and applying the required force to insert or withdraw the connector. It is to be noted that in such manual connection and disconnection the coupling 37 does not move relative to the connector 44, and therefore the drogue gun 12 is not actuated.

Referring now to FIGURES 3, 4 and 5 the progressive operation of the mechanism 10 is shown. Upon introduction of the pressurized gas through passageway 20 into the bore 22 of the mechanism, the piston 27 is urged downwardly, thereby shearing the shear pin 32. The initial movement of piston 27 moves the enlarged bore 54 downwardly from its position opposite the balls 53 to thereby position the internal bore 55 of the piston directly opposite the latch balls 53 with the inclined surface between bores 54 and 55 forcing the balls inwardly to latch the pin 41 of the coupling 37 to the rod 25. Further downward movement of piston 27 causes a shoulder 70 of the piston 27 to engage the upper extremity of the annular skirt 47 on the connector 44 as shown in FIGURE 3. The continued downward force on piston 27 by the pressurized gas urges the connector 44 downwardly in opposition to the resilient retention by the detent balls 61, but the coupling 37 remains latched to the central rod 25 by the balls 53 being held inwardly by the bore 55. As a result of this relative movement between connector 44 and coupling 37, the flexible cable 35 is pulled relative to its enclosing sheath 36 to thereby actuate the drogue gun 12 as desired. The downward movement of piston 27 continues to the position illustrated in FIGURE 4, wherein the upwardly facing shoulder 57 on rod 25 engages the piston 27 to stop the downward movement of the piston. At this final position in the stroke of the piston 27, the latching balls 53 are released into the groove 56, whereby the pin 41 of coupling 37 is completely released. Also in this position, the connector 44 is almost completely out of the mechanism 10. The momentum of the downward force on connector 44 ejects the connector 44 and coupling 37 from the mechanism 10, as illustrated in FIGURE 5. A plurality of ports 71 are provided in connector 44 to prevent the creation of a suction or vacuum in the cavity 72 as the connector 44 is urged downwardly relative to the retained coupling 37, which suction might otherwise tend to inhibit the separation of connector 44 from the piston 27 at the conclusion of the downward stroke.

Thus it may be seen from the foregoing description of the mechanism 10 that a device is provided which readily and efficiently serves the function of first actuating a flexible cable enclosed in a sheath and then effecting a physical disconnect and separation of the cable and sheath from the mechanism. Moreover, the sheath cable can be readily installed in the mechanism by simply inserting same, and may be released from the mechanism by merely pulling on the sheath, both of which can be accomplished without any possibility of actuating the cable by causing relative movement between the cable and the enclosing sheath.

Finally, the disclosed embodiment is extremely compact, and the principles employed are adaptable to other embodiments without loss of either compactness or efficiency.

Having fully described my invention, it is to be understood that I do not wish to be limited to the details herein set forth, or to the details illustrated in the drawings, but rather my invention is of the full scope of the appended claims.

I claim:

1. In a mechanism to sequentially operate and disconnect a tension actuated cable and enclosing sheath, the combination of: means for resiliently connecting the enclosing sheath to the mechanism in a manner releasable and installable solely by applying an unidirectional force, latch means for selectively connecting the tension actuated cable to the mechanism, operating means movable from a first position through an operating stroke to a second position upon actuation of the mechanism, cooperating means on said latch means and operating means for gripping the tension actuated cable during said operating stroke and for completely releasing the cable in both said first and second positions, and said operating means during said operating stroke causing relative movement between the cable and enclosing sheath to tension actuate the cable and disconnect the enclosing sheath from the mechanism.

2. In a mechanism to sequentially operate and disconnect a tension actuated cable and enclosing sheath, the combination of; a housing having a longitudinal bore open on one end and closed on the other, an operating piston slideably mounted in said housing bore for longitudinal movement from a first position toward the open end to a second position upon actuation of the mechanism, latch means mounted in said housing adapted to receive the tension actuated cable through the open end of the housing, cooperating means on said piston and latch means for operating said latch means to cause unlatching of the tension actuated cable in said first and second positions of said piston and latching of the cable to the housing between said first and second positions, means cooperating with said housing to releasably mount the enclosing sheath in the open end, said piston having means for urging the enclosing sheath from the housing during said longitudinal piston movement after a predetermined movement from said first position thereby first causing tension actuation of the cable and then release of the cable and sheath upon the piston reaching said second position.

3. The mechanism of claim 2 in which the housing has a pivotal mounting for turning in the direction of tension force applied to the enclosing sheath, and said operating means mounting the enclosing sheath in the housing is releasable upon the simple application of a tension force to the sheath.

4. The mechanism of claim 2 in which said cooperating means on said piston and latch means comprises at least one laterally moveable element engageable with a longitudinal surface on said piston to move into and out of latching engagement of the cable, and said longitudinal piston surface is shaped to cause said latching movement of said element between said first and second positions of the piston.

5. The mechanism of claim 4 in which said laterally moveable element is a ball positioned in a laterally extending bore.

6. The mechanism of claim 2 in which said longitudinal bore is cylindrical, a rod is centrally mounted in said bore extending longitudinally from the closed end toward the open end concentric with the bore, said operating piston is tubular and has sealing means between said piston and the said rod and bore, and said latch means is provided on the extending end of said rod.

7. The mechanism of claim 2 in which a connector is joined to the enclosing sheath and is provided with said means cooperating with said housing to mount the connector, said connector having resilient detent means directed laterally to engage a groove in the open end of said housing in a manner releasable and installable simply upon a predetermined longitudinal force on the connector, and said piston having means for engaging said connector after predetermined movement from said first position toward said second position to apply said connector releasing force.

8. The mechanism of claim 2 in which the tension actuated cable and enclosing sheath each have a connecting means for connection to said latch means and housing open end, respectively, and said sheath connecting means has a portion encircling the said cable connecting means for preventing inadvertent pulling of said cable connecting means with the cable and sheath separated from said mechanism.

9. The mechanism of claim 2 in which a frangible means connects said piston to said housing in said first position for preventing movement of said piston except upon actuation of the mechanism destroying said frangible means.

10. In a mechanism to sequentially operate and disconnect a tension actuated cable and enclosing sheath which are selectively releasable from the mechanism by tension without actuating the mechanism, the combination of: a housing adapted for pivotal mounting for turning in the direction of tension force applied to the enclosing sheath for tension release, said housing having a longitudinal bore open on one end and closed on the other comprising a cylinder, a rod centrally mounted in said housing cylinder and extending longitudinally from the closed end toward the open end concentric with the bore, a tubular piston slidably mounted in said housing cylinder for longitudinal movement from a first position toward the open end to a second position, sealing means between said piston and the said rod and cylinder, said rod having a selectively operable latch mechanism at the extending end, a coupling joined to the tension actuated cable and having a portion positioned in said latch mechanism, cooperating means on said tubular piston and latch mechanism for operating said latch mechanism to cause unlatching of said coupling in said first and second positions of said piston and latching of said coupling to the rod during the movement of said piston between said first and second positions, a connector joined to the enclosing sheath and having means cooperating with said housing to mount the connector in the open end in a manner releasable simply upon a predetermined longitudinal force, said piston having means for engaging said connector after predetermined movement from said first position toward said second position to apply said connector releasing force, and means for applying pressure to said piston to longitudinally move the piston from said first position to first latch the coupling to the rod and then to urge said connector and sheath longitudinally relative to the coupling and cable causing both tension actuation of the cable and release of said connector and finally to disconnect said coupling from the latch mechanism upon the piston reaching said second position.

References Cited

UNITED STATES PATENTS 2,665,331    1/1954    Berndt _____ 24—122.3 X
3,270,387    9/1966    Ziegler _____ 24—230.1 X BERNARD A. GELAK, *Primary Examiner.*